Figure 1B:
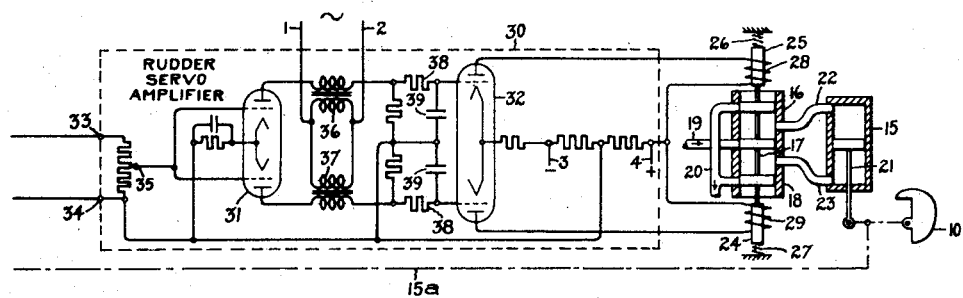

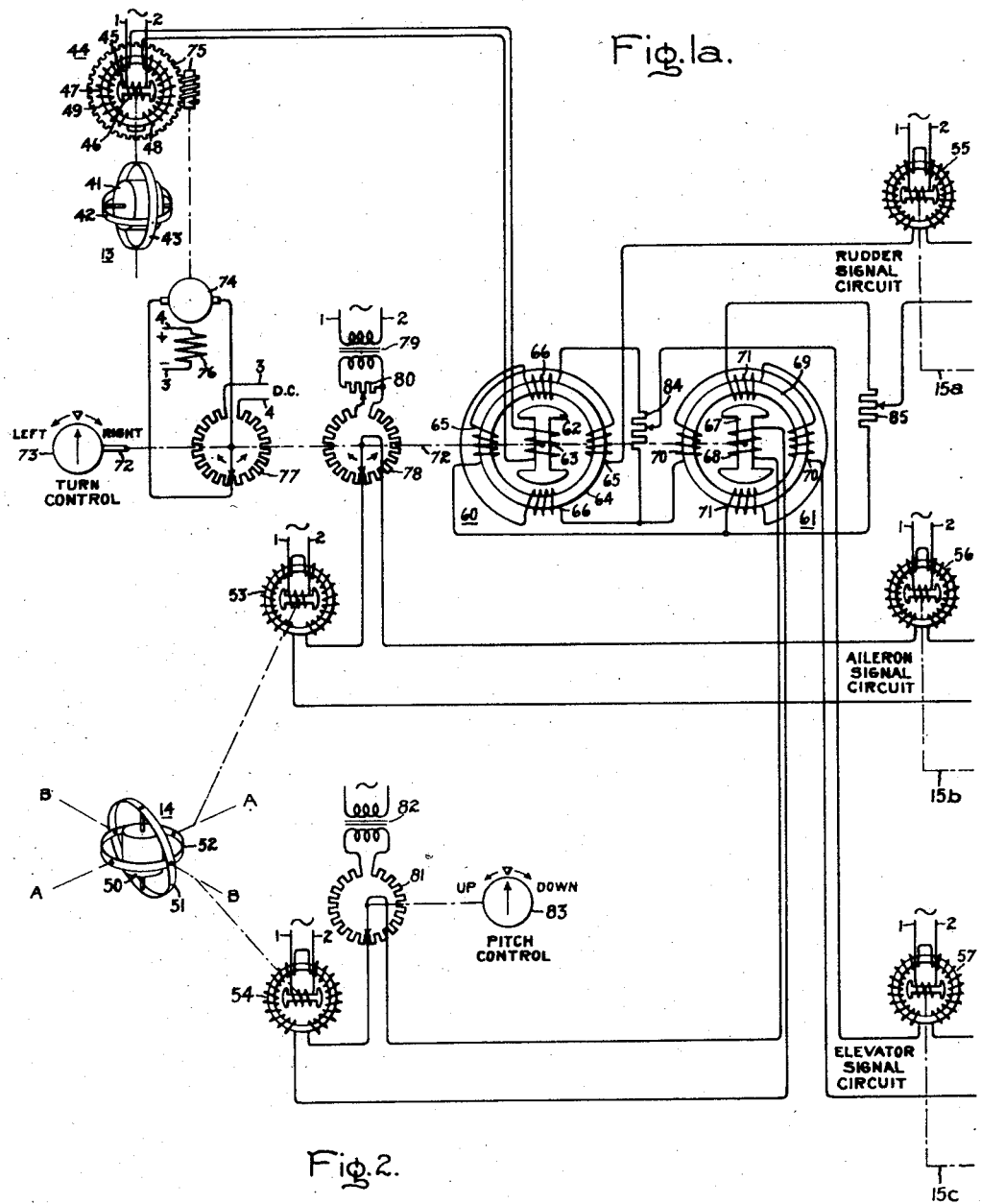

May 29, 1951 D. R. WEBB 2,555,019
AIRCRAFT STABILIZING APPARATUS
Filed Jan. 6, 1945 2 Sheets-Sheet 2

Inventor:
Donald R. Webb,
by His Attorney.

Patented May 29, 1951

2,555,019

UNITED STATES PATENT OFFICE 2,555,019

AIRCRAFT STABILIZING APPARATUS

Donald R. Webb, Schenectady, N. Y., assignor to General Electric Company, a corporation of New York Application January 6, 1945, Serial No. 572,759

3 Claims. (Cl. 244—77)

The present invention relates to aircraft control, and more particularly to apparatus for stabilizing and controlling aircraft in flight known in the art as an automatic pilot.

It is desirable that an automatic pilot be constructed so that it will stabilize the aircraft in curved flight as well as straight and level flight so that precise maneuvering turns may be executed. It is also desirable that the controls be coordinated so that the proper angle of bank will be maintained for a given rate of turn. Stabilization of an aircraft in curved flight raises certain difficult problems which are not encountered in straight and level flight. One very serious problem arises from the fact that the directional and vertical or horizontal gyroscopes usually used to measure the displacement of the aircraft about the turn, pitch and bank axes, tend to maintain the orientation of their spin axes fixed in space, while the aircraft rudder, aileron and elevator control surfaces, which are controlled by the gyroscopes, move about axes which are fixed relative to the aircraft. During straight and level flight, the control axes of the aircraft and the gyroscope are parallel and no difficulty arises. However, if the airplane is banked an appreciable amount, as in a turn, the turn and pitch axes of the aircraft become displaced from the gyroscope axes and as a result the aircraft controls are not operated properly. This problem becomes more and more acute as the angle of bank is increased for high speed maneuvering turns. Thus, when the airplane approaches a vertical bank, the rudder no longer controls the turn of the airplane but produces either a climb or a dive and the elevators no longer control the pitch of the airplane but increase or decrease the rate of turn. A conventional automatic pilot would, therefore, control the wrong surfaces under this condition and lose control over the airplane.

An object of the present invention is to provide a new and improved maneuvering type of automatic pilot.

Another object of the present invention is to provide an automatic pilot which will stabilize an aircraft under all conditions of flight, including curved flight at high bank angles.

A further object of the invention is to provide a control system for aircraft which automatically switches turn and pitch control signals between elevator and rudder controls in accordance with the angle of bank of the aircraft.

Other objects and advantages of the present invention will become apparent as the following description proceeds.

Briefly, according to the present invention, I provide an automatic pilot having signal mixers for effecting an interchange of turn and pitch signals between the rudder and elevator control channels. The signal mixers are so connected that as the airplane banks, an increasing portion of the turn signal is fed into the elevator control channel and an increasing portion of the pitch signal is fed into the rudder control channel. When the angle of bank reaches 90°, i. e., a vertical bank, all of the turn signal is fed into the elevator channel and all of the pitch signal is fed into the rudder channel. Thus, as the control functions of the rudder and elevators interchange, relative to axes fixed in space, as the airplane banks, the turn and pitch control signals interchange accordingly so that the airplane responds correctly to the turn and pitch signals for all angles of bank.

My invention will be better understood from the following description taken in connection with the accompanying drawings and its scope will be pointed out in the appended claims.

In the drawing Figs. 1a and 1b, taken together show, in schematic form, a maneuvering type of automatic pilot embodying the signal mixers and other features forming the subject matter of the present invention, and Fig. 2 shows, by means of curves, the relationship between certain output voltages of the signal mixers, these curves being useful in explaining the operation of the system.

Figure 1B:
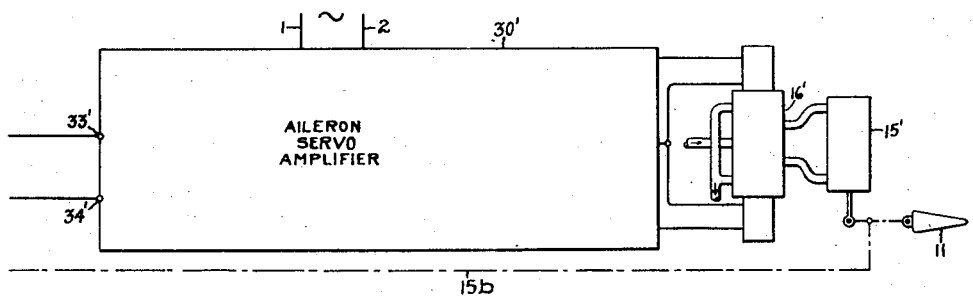
Figure 1B:
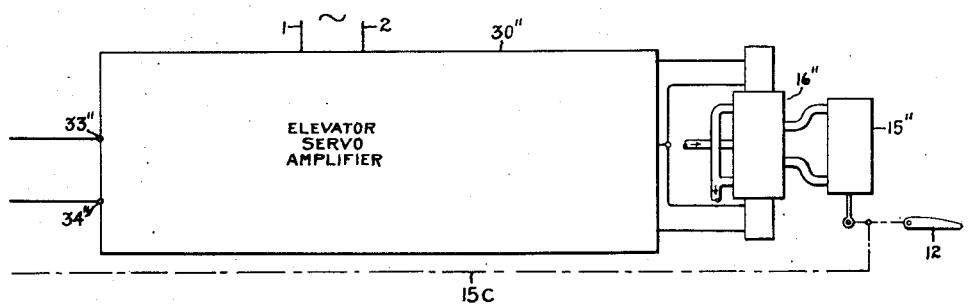

Referring to Fig. 1 of the drawing, the control surfaces 10, 11 and 12 represent the conventional rudder, aileron and elevators used for controlling the movements of an aircraft about the turn, bank and pitch axes respectively. Displacement of the aircraft about the vertical or turn axis is measured by means of a suitable position-maintaining means such as a conventional directional gyroscope 13, while displacements of the aircraft about the lateral or pitch axis and the longitudinal or bank axis are measured by means of another suitable position-maintaining means such as a conventional vertical or horizon gyro 14.

The basic automatic pilot, by means of which the rudder 10, ailerons 11 and elevators 12 are actuated in accordance with aircraft displacements as measured by the directional gyro 13 and the vertical gyro 14, may be an electric-hydraulic type similar to that shown in a copending application of A. Hansen et al., Serial No. 488,914, filed May 28, 1943, now Patent No. 2,416,097, issued February 18, 1947, which is assigned to the same assignee as the present invention. In the automatic pilot disclosed in the above-mentioned copending application, the rudder 10 is actuated by means of a hydraulic servomotor 15 of the push-pull type, the movements of which are controlled by a solenoid-operated transfer valve 16. The transfer valve 16 comprises a conventional three-land valve element 17 which slides in a suitably ported valve sleeve 18. When the valve element 17 is in the center position shown in the drawing, the ports connected to an oil-pressure supply line 19 and an oil drain or return line 20 are closed, and the piston 21 of the hydraulic servomotor 15 is locked. When the valve element is moved downwardly, the pressure supply and drain ports of the valve are opened in such a manner that the oil flows through pipe 22 to the top side of the servomotor piston 21 forcing it downwardly, the oil on the underside of the piston 21 returning to the drain line 20 through the pipe 23. On the other hand, if the valve is displaced upwardly, oil flows from the pressure line 19 through the pipe 23 to the underside of the piston 21 forcing it upwardly, the oil on the upper side of the piston returning to the drain line 20 through the pipe 22.

Movements of the valve element 17 are controlled by means of two oppositely disposed solenoids 24 and 25, which, when energized, exert opposing forces on the valve element. Suitable spring means, such as compression springs 26 and 27, are also provided for centering the valve element. For the purpose of obtaining proportional control, the solenoids 24 and 25 are preferably of the proportional type, i. e., they exert a force on the valve element which is approximately proportional to the current flowing in the solenoid energizing windings 28 and 29. Preferably proportional solenoids, which are responsive to very small changes in energizing current, are used, such as are disclosed in U. S. Patent No. 2,435,817 of February 10, 1948.

In order to provide a means for differentially energizing the windings 28 and 29 of the solenoids 25 and 26, in accordance with an alternating current control signal derived in a manner to be later described, there is provided a rudder servo amplifier indicated generally as 30. The servo amplifier is a balanced electronic device so constructed that when the input signal is zero, equal direct currents are supplied to the two opposing solenoids of the transfer valve whereby the valve remains in the center position. However, when an input signal of one polarity is applied to the amplifier input, the current supplied to one solenoid increases while the current supplied to the other decreases whereby the valve is displaced causing the servo motor 15 to move in one direction. Conversely, if an input signal of the opposite polarity is applied to the amplifier, the unequal current distribution to the solenoid is reversed, causing the valve and servomotor to move in the reverse direction. Within limits, the solenoid current unbalance, the displacement of the valve 17 of the transfer valve, the oil flow rate, and the speed of the servomotor are proportional to the magnitude of the input signal.

Any one of a number of different types of discriminator-rectifier amplifiers may be used to accomplish the desired function indicated above. For the purpose of illustration, there is shown a two-stage amplifier comprising a double element triode discriminator electron tube 31 and a double element triode amplifier electron tube 32. An input alternating current signal voltage applied to the input terminals 33, 34, the magnitude of which is adjustable by means of a gain control potentiometer 35, is fed to the grids of the discriminator tube 31. The plates of the tube 31 are supplied with alternating current from transformers 36 and 37 which are energized from the alternating current supply leads 1 and 2. The transformers are connected so that the voltages supplied to the plate of the tube 31 are 180 electrical degrees out of phase. In this manner the rectified output of the two sections of the tube 31 are made to vary oppositely in accordance with the polarity of the input signal, the input signal being in phase or 180 degrees out of phase with the alternating current supply voltage 1, 2. The rectified outputs of the two sections of the discriminator tube 31 are fed to the two grids of the amplifier tube 32 after passing through suitable filter networks which may comprise resistors 38 and capacitors 39. The positive terminal 4 of a direct current power supply is connected to the two opposite plates of the amplifier tube 32 through the two solenoid windings 28 and 29, the common cathode return circuit being connected to the negative direct current power supply terminal 3. In view of the foregoing it will now be apparent to those skilled in the art that the output of the two sections of the amplifier tube 32 and consequently the relative energization of the two solenoids 24 and 25 of the transfer valve 16 will vary in accordance with the polarity and magnitude of an alternating current input signal voltage applied to the input terminals 33 and 34.

Similarly, the ailerons 11 and the elevators 12 of the aircraft to be controlled are actuated by hydraulic servomotors 15' and 15", transfer valves 16' and 16", and servo amplifiers 30' and 30" which operate in the same manner as the rudder controls described above so that no additional description of these parts is necessary.

Summarizing, it may be said that the servo amplifier, transfer valve, and hydraulic servo of each of the three control channels constitute a polarity sensitive, electroresponsive means for actuating the associated control surface in a direction determined by the polarity of the input signal voltage and at a speed which is proportional, within limits, to the magnitude of the input voltage. Obviously other combinations of amplifiers, and electric, hydraulic, or other types of servomotors may be used to accomplish the same result.

The signal system by means of which the servo amplifiers are caused to actuate the rudder, ailerons and elevators of the aircraft so as to stabilize the aircraft in curved as well as straight and level flight will now be described.

As mentioned above, a conventional directional gyro 13 may be used as a reference to measure displacements of the aircraft about the vertical or turn axis which is stabilized in space. The directional gyro is shown as comprising a gyro rotor 41 which is rotated by any suitable motor means not shown. The gyro is mounted for three degrees of freedom in a conventional gimbal system comprising an inner or horizotal gimbal ring 42 and an outer or vertical gimbal ring 43. The gyro spin axis lies in a horizontal plane and due to the characteristic gyroscopic property of rigidity, the vertical gimbal ring 43, which is mounted in the aircraft for rotation about a vertical axis, tends to maintain its azimuth orientation in space.

In order to obtain a suitable control signal responsive to displacement of the aircraft about the turn axis for controlling the rudder so as to maintain a constant heading or course, there is provided a turn control signal generator 44. This signal generator is an inductive type comprising a rotor 45 having a primary or exciting winding 46 and a stator 47 having two differentially connected windings 48 and 49. The rotor is connected to the alternating current supply source 1, 2, as are all the signal generators and servo amplifiers of the automatic pilot, so as to maintain proper phase relationship of the control signals. When the rotor is in the null position shown, the voltages induced in the stator windings cancel out, giving a zero output signal. If the rotor is displaced in one direction from the null position, a net voltage is induced in the stator winding which is in phase with the primary voltage. On the other hand, if the rotor is displaced in the opposite direction, a net stator voltage is induced which is 180 degrees out of phase with the primary voltage. For rotor displacement in either direction from the null position, the voltage is varied approximately sinusoidally.

The rotor of the signal generator 44 is coupled directly to the vertical gimbal ring 43 of the directional gyro 13 while the stator 47 is mounted on the case of the gyro (not shown) so that it rotates with the airplane. The stator 47 is also mounted by suitable means so that it may be rotated relative to the case for the purpose of changing the course of the airplane as will be more fully described below.

Due to the fact that the directional gyro holds the rotor of the rudder signal generator fixed in space while the stator rotates with the aircraft, it will be evident that the stator output voltage will vary in phase or polarity in accordance with the direction of displacement of the aircraft from a predetermined fixed azimuth heading and the magnitude of the voltage will vary with the amount of the displacement.

The vertical or horizon gyro 14, which is used as a reference for measuring displacement of the aircraft about pitch and bank axes which are stabilized in space, comprises a rotating gyro element 50 having a vertical spin axis, the gyro being rotated by any suitable motor means not shown. The gyro is mounted for three degrees of freedom in a conventional gimbal system comprising a vertical gimbal ring 51 and a horizontal gimbal ring 52. The vertical gyro is oriented so that when the aircraft is level, the axis of rotation of the gimbal 52, A—A lies in the direction of the longitudinal axis while the axis of rotation of the gimbal 51, B—B lies in the direction of the transverse axis. Due to the characteristic gyroscopic property of rigidity, the vertical gyro tends to maintain the orientation of its spin axis in space so that displacement of the aircraft about the axes A—A and B—B can be measured by the movement of the gyro case relative to the gimbals 51 and 52 in a well known manner.

To obtain control voltages variable in magnitude and polarity in accordance with the displacement of the aircraft about the pitch and bank axes, bank and pitch signal generators 53 and 54 are provided, these generators being identical in construction to the turn signal generator 44 described above. The rotor of the bank signal generator 53 is coupled directly to the gimbal 52 of the vertical gyro so as to be responsive to banking movements of the aircraft about the axis A—A while the rotor of the pitch signal generator 54 is directly coupled to the gimbal 51 of the vertical gyro so as to be responsive to displacement of the aircraft about the pitch axis B—B.

The rudder 10, the ailerons 11, and the elevators 12 are controlled by voltages introduced in rudder, aileron and rudder signal circuits which are connected respectively to the input terminals 33—34, 33'—34', and 33''—34'' of the rudder, aileron and elevator servo amplifiers.

In the rudder, aileron and elevator signal circuits, there are connected the stator windings of follow-up signal generators 55, 56, and 57 which are shown as identical in construction to the turn, bank and pitch signal generators 44, 53, and 54 previously described. The rotors of the follow-up signal generators are mechanically coupled to the hydraulic servomotors 15, 15' and 15'', as indicated by the dotted lines 15a, 15b, and 15c, so that they are rotated in either direction from the null or zero voltage position in accordance with the direction of movement of the servomotor from a position corresponding to the flight neutral or streamlined position of the associated control surface. As indicated, the primary windings of the follow-up signal generators are connected to the common alternating current supply source 1, 2.

The purpose of the follow-up signal generator is to limit the movement of the associated control surface to an amount proportional to a displacement signal voltage introduced elsewhere in the signal circuit in a manner which will be subsequently described. This is accomplished by connecting the stator windings of the follow-up signal generator in the signal circuit so as to produce a voltage opposing the displacement voltage in response to movement of the servomotors and the control surfaces initiated by application of the displacement signal voltage. The proportioning action of the follow-up signal generator improves the stability of the control and prevents hunting of the control surfaces and aircraft. In addition, the follow-up signal generator causes the control surface to be returned to flight neutral in the absence of a displacement voltage elsewhere in the signal circuit.

In order to operate the ailerons 11 in a manner to stabilize the aircraft about the longitudinal or bank axis, the bank signal generator 53 is coupled directly to the aileron signal circuit. In this manner a displacement signal voltage is provided which is responsive to a banking displacement of the aircraft as measured by the vertical gyro 14, and which has a polarity such that the ailerons are actuated in a direction to restore the airplane to a preselected banking attitude.

In the automatic pilot control disclosure of the above-mentioned copending application of A. Hansen et al, the turn signal generator 44 and the pitch signal generator 54 are similarly coupled directly to the rudder and elevator signal control circuits so as to additionally stabilize the aircraft about the turn and pitch axes. While this arrangement is perfectly satisfactory for stabilizing the aircraft in straight and level flight and in turns involving relatively small bank angles, it is not entirely satisfactory for high speed maneuvering involving relatively high bank angles. The reason that it is not entirely satisfactory is the above-mentioned fact that in banking attitudes involving a high bank angle, the turn and pitch control axes of the aircraft become displaced from the turn and pitch axes established in space by the gyros so that the rudder and elevator control surfaces of the aircraft do not give the proper response called for by the gyro signal.

According to the present invention, the above-mentioned difficulty is overcome by the provision of turn and pitch signal mixers 60 and 61 which operate to introduce a voltage proportional to the turn signal voltage into the elevator signal circuit, and a voltage proportional to the pitch signal voltage into the rudder signal circuit, the amount of cross-signal mixing being variable in accordance with the angle of bank. The manner in which the signal mixers function in order to accomplish this desired result will now be described.

The turn signal mixer 60 is an inductive device having a rotor 62 carrying a primary winding 63 which rotates within an annular stator 64. The stator carries two sets of cumulatively connected stator windings 65 and 66, which are physically spaced so that the voltages induced in the windings 65 and 66 vary in accordance with sine and cosine functions, respectively, of the angular displacement of the rotor relative to the stator.

The pitch signal mixer 61 is similar to the turn signal mixer 60 and comprises a rotor 67 carrying a rotor or primary winding 68 which rotates within an annular stator core 69. The stator 69 carries two pairs of cumulatively connected windings 70 and 71 which are physically spaced on the stator core 69 in the same manner as the rudder signal mixer 60.

The curves shown in Fig. 2 of the drawing show how the voltages induced in the two sets of stator windings of the signal mixers vary with angular displacement of the rotor from a neutral center position shown when the rotor winding is excited with an alternating current. Thus, the curve A shows the relationship between the voltages induced in the stator winding 65 and the rotor position while the curve B shows the relationship between the voltages induced in the windings 66 and rotor position.

These curves are essentially sine and cosine functions of rotor displacement, the magnitudes of the voltages varying in proportion to the rotor excitation voltage. The curves A and B also represent the voltages induced in the corresponding stator windings 70 and 71 of the pitch signal mixer 61.

It will be noted that the primary winding 63 of the turn signal mixer is connected directly to the output of the turn signal generator 44 while the primary rotor winding 68 of the pitch signal mixer is connected directly to the output of the pitch signal generator 54. Also, it will be noted that the stator winding 65 of the turn signal mixer and the stator winding 71 of the pitch signal mixer are connected in series circuit relationship in the rudder signal circuit, while the windings 66 of the turn signal mixer and the windings 70 of the pitch signal mixer are connected in series circuit relationship in the elevator signal circuit.

Keeping in mind the curves A and B of Fig. 2 of the drawing, it will be seen that when the rotor 62 of the turn signal mixer is in the neutral position, a voltage will be induced in the winding 65 proportional to the turn signal voltage, but no voltage will be induced in the winding 66. Similarly, when the rotor 67 of the pitch signal mixer is in the neutral position shown, a voltage proportional to the pitch signal will be induced into the winding 70 but no voltage will be induced into the winding 71. For this condition then a displacement voltage will be introduced into the rudder signal circuit which is proportional to the voltage output of the turn signal generator 44 and a displacement voltage will be introduced into the elevator signal circuit which is proportional to the output voltage of the pitch signal generator 54. The operation of the automatic pilot will then be the same as if the turn and pitch signal generators had been coupled directly to the rudder and elevator signal circuits.

If now the rotors of the signal mixers are displaced in unison to the right or left, it will be apparent that sine and cosine components of the turn signal voltage will be induced in the windings 65 and 66 and sine and cosine components of the pitch signal voltage will be induced in windings 70 and 71. Since the windings 65 and 71 are in series, sine and cosine components of turn and pitch signal voltages are algebraically added as a result the rudder 10 is displaced in accordance with the resultant signal. Similarly, since windings 66 and 70 are in series, sine and cosine components of the pitch and turn signal voltages are algebraically added so that the elevator is displaced in accordance with the resultant. If now the rotors of the signal mixers are displaced in accordance with the angle of bank of the aircraft, the desired interchange of rudder and elevator signals is obtained.

In order to displace the rotors of the signal mixers in accordance with the angle of bank of the aircraft, I have illustrated an arrangement in which the signal mixers are coupled to the turn control of the automatic pilot as will now be described.

The rotors 62 and 67 of the turn and pitch signal mixers are coupled together by means of a rotatable shaft 72 so that they maintain the same angular relationship with respect to the stator windings of both signal mixers. The shaft 72 is shown as being mechanically coupled to a turn control knob 73 by means of which the aircraft is caused to make maneuvering turns to the right or left.

In order to cause the aircraft to turn in response to movement of the turn control knob 73, there is provided a course motor 74 which is coupled through a suitable gear reduction 75 so that it rotates the stator 47 of the turn signal generator. While any suitable variable speed course motor may be used, there is shown a direct current shunt motor having a constantly energized field 76. In order to control the speed and direction of the course motor, the polarity and magnitude of the armature voltage is controlled by means of a center tapped turn control potentiometer 77 having a resistance element connected to the direct current supply leads 3, 4. With the armature connected to the center tap and wiper, as shown, it will be apparent that the motor will rotate in a direction and at a speed variable in accordance with the direction and displacement of the wiper from the center position shown.

The shaft 72 is coupled to the wiper of the potentiometer 77 so that the displacement of the knob 73 causes a rotation of the course motor 74, and consequently the stator of the turn signal generator 44, in a direction dependent upon the direction of displacement of the knob 73 and at a speed depending on the amount of displacement. Also, connected to the shaft 72 is center tapped bank setter potentiometer 78 having a resistance element energized by the secondary winding of a transformer 79, the primary of which is connected to the alternating current supply leads 1, 2. The wiper and center tap of the potentiometer 78 are connected in circuit with the aileron signal circuit so that as the wiper is displaced in one direction or the other in response to movement of the turn control knob 73, an alternating current bias voltage is introduced into the aileron signal circuit. Insertion of the bias voltage causes a banking of the aircraft in one direction or the other, depending upon the polarity of the bias voltage since the aircraft must bank in one direction or the other to reduce to zero the resultant displacement voltage fed into the aileron signal circuit. A potentiometer 80 may be provided for varying the amount of the bank bias voltage, and consequently the angle of bank of the aircraft, for a given rate of turn of the aircraft as determined by the angular position of the shaft 72. This permits the angle of bank to be adjusted for various air speeds since, as well known, the angle of bank varies not only in accordance with the rate of turn but also in accordance with the air speed.

In order to adjust the pitch of the aircraft either during straight flight or during a turn, there may be provided a center tapped potentiometer 81 having a resistance element energized from the secondary winding of a transformer 82 having its primary winding connected to the alternating current supply leads 1, 2. The center tap and wiper of the potentiometer are connected in series circuit relation with the output of the elevator signal generator 54 so that by manipulation of a suitable control knob 83 an adjustable bias voltage may be introduced in series with the pitch signal generator 54 causing a change in the pitch attitude of the aircraft.

In operation, let it be assumed that the turn control and pitch control knobs 73 and 83 are placed in the center position and that the automatic pilot is engaged as by turning on the oil supply connected to the oil pressure lines 19.

If displacement of the aircraft about the turn, bank, or pitch axes occurs, the turn, bank and pitch signal generators 44, 53, and 54 produce voltages which are connected or inductively coupled to the rudder, aileron and elevator signal circuit causing an unbalance of the servo amplifier, the displacement of the transfer valve, and operation of the corresponding servomotor and control surface to restore the aircraft to course as will be clear in view of the foregoing. For this condition it will be noted that the inductive coupling through the signal mixers 60 and 61 is such that none of the turn signal voltage is induced in the winding 66 in the elevator circuit and none of the pitch signal voltage is induced in the winding 71 in the rudder signal circuit.

Now let it be supposed that it is desired to make a bank to the right. To accomplish this the human pilot turns the knob 73, and consequently the shaft 72, to the right. This causes several things to happen as follows: Displacement of the wiper of the potentiometer 77 starts the course motor 74 which displaces the stator of the turn signal generator 44, resulting in a turn signal voltage which causes a turning of the aircraft at a rate proportional to the speed of the course motor 74. Displacement of the wiper of the potentiometer 78 causes a bias voltage to be introduced into the aileron signal circuit resulting in a bank of the aircraft at an angle proportional to the rate of turn. Displacement of the shaft 72 also causes the rotors 62 and 67 of the rudder and elevator signal mixers to rotate to the right from the neutral position shown. The primary winding 63 of the turn signal mixer 60 is excited by the output of the turn signal generator 44 and as a result of the angular displacement of the rotor, voltages proportional to the turn signal voltage will be induced in both sets of stator windings 65 and 66. Since the windings 65 and 66 are connected in the rudder and elevator signal circuits respectively, both the rudder 10 and the elevators 12 will respond to the turn signal. By connecting the windings of the signal mixers for proper polarities, the turn signal induced in the rudder signal circuit will displace the rudder to the right for the desired right turn, and the signal induced in the elevator signal circuit will move the elevator in an up-elevator direction to counteract for the nose lowering effect of the displaced rudder.

If during the right turn the human pilot desires to change the pitch attitude of the aircraft to perform a spiral, say, a diving spiral, he adjusts the pitch control knob 83 in a direction for a dive. The resultant displacement of the wiper of the potentiometer 81 results in a bias voltage which excites the rotor winding 68 of the pitch signal mixer 61. Due to the displacement of the rotor 67 to the right, voltages proportional to the pitch signal voltage will be induced in both sets of stator windings 70 and 71 of the pitch signal mixer 61. Since the windings 70 and 71 are connected in the elevator and rudder signal circuits respectively, both the rudder 10 and the elevator 12 will respond to the elevator signal. By properly connecting the windings of the signal mixers, the pitch signal induced in the rudder signal circuit will cause additional displacement of the rudder which operates also to lower the nose of the aircraft and the voltage induced in the elevator signal circuit to cause a movement of the elevator in a downward direction which also tends to lower the nose. When desired change in pitch attitude has been accomplished, the voltage output of the pitch signal generator 54 cancels the voltage induced by the potentiometer 81, removing the excitation from the rotor of the pitch signal mixer. Consequently, the pitch signal voltage induced in the rudder and elevator signal circuits is removed. Similarly if the knob 83 is adjusted for a climb, voltages of opposite polarities will be induced in the rudder and elevator signal circuits, causing the rudder and elevators to move in the opposite direction to insure the pitch of the aircraft.

If it is desired to make a left turn, the turn control knob 73 and the shaft 72 are displaced to the left and just the reverse of the above-described operation will take place, causing a banked turn to the left as will be clearly apparent from the foregoing.

It is important to note, however, that as the rotor of the turn signal mixer is displaced from a right to a left position, the polarity of the voltage induced in the elevator control winding 66 relative to the voltage of the rotor winding 63 is reversed, as will be apparent by reference to curve B, Fig. 2 of the drawing. Also, as the direction of turn is changed from right to left, the polarity of the voltage output of the turn signal generator 44 reverses, causing a reversal of the voltage applied to the rotor winding 63. As a result of these two reversals, the polarity of the voltage induced in the elevator control winding 66 is the same for either direction of turn, which is exactly the desired condition because an up-elevator signal is required for either direction of turn to compensate for nose heaviness. On the other hand, a signal voltage from the pitch signal generator 54 or the potentiometer 81 causes a voltage of the same polarity to appear across the rotor winding 68 of the elevator signal mixer for either direction of turn and bank. Therefore, the voltage induced in the rudder control winding 71 of the pitch signal mixer reverses with the direction of turn. Again, this is exactly the desired condition because a rudder displaced, say to the left during a left bank in turn will cause the nose of the aircraft to drop, while a displacement of the rudder to the left in a right bank and turn will tend to cause the nose to rise.

It will be apparent that if the rotors of the signal mixers are rotated 90 degrees either to the right or left of the neutral position, there will be a complete exchange of turn and pitch control signals between the rudder and elevator signal circuits. For all intermediate positions of the rotors of the signal mixers and consequent angles of bank, the amount of cross-signal mixing will be properly proportioned, as will be clearly apparent from the foregoing.

In some cases it may be found desirable to provide means for adjusting the component of the turn signal fed into the elevator signal circuit and the component of the pitch signal fed into the rudder signal circuit to obtain best operation. For this purpose, adjustment potentiometers 84 and 85 are provided. As shown, the resistance element of potentiometer 84 is connected across the output of pitch signal windings 66 of the turn signal mixer 60 so that by adjusting the position of the wiper, which is connected to the elevator signal circuit, an adjustable portion of the voltage across windings 66 can be introduced into the elevator signal circuit. Similarly, the resistance element of potentiometer 85 is connected across the turn signal windings 71 of the pitch signal mixer 61 so that by adjusting the position of the wiper, which is connected to the rudder signal circuit, an adjustable portion of the voltage across windings 71 can be introduced into the rudder signal circuit. Thus, by adjusting potentiometers 84 and 85, the amount of cross-signal mixing can be varied so that a flexible system is provided that can be easily adjusted to aircraft having different aerodynamic response characteristics.

In order to realize the proper signal mixing by the signal mixers 60 and 61, it is necessary that the rotors of the signal mixers be displaced in an amount which varies in accordance with some function of the angle of bank. It should be clearly understood, therefore, that any suitable means responsive to the angle of bank of the aircraft can be used to actuate the signal mixers, and that my invention is not limited to the disclosed arrangement in which the signal mixers are actuated by the turn controller 73. Thus, for example, the signal mixers might be coupled to the gimbal 52 of the vertical gyro 14 so as to be actuated in the same manner as the bank signal generator 53.

Also, it may be found that some relationship of the mixed turn and pitch signals other than the sine and cosine functions of the angle of bank may be required with certain types of aircraft, depending upon their aerodynamic response characteristics, although I have found from flight tests that the illustrated arrangement is generally satisfactory. However, if it is desired to change the relationship of the mixed signals, this can be accomplished by varying the physical relationship of the windings on the stators of the signal mixers, or an equivalent result can be obtained by driving the rotors of the signal mixers in accordance with some non-linear function of the angle of bank.

It should be understood that my invention is not limited to an arrangement in which the turn and pitch signals which are mixed originate in signal generators actuated by position-maintaining means such as a gyroscope, compass, or the like. Thus where signal mixing is desired without stabilization of the aircraft, the turn and pitch signals may originate in manually operated turn and pitch signal generators.

It should also be understood that my invention is not necessarily limited to the illustrated combination of two signal mixers. Thus, for example, the turn signal mixer 60 may be used alone to give up-elevator for either right or left turn signals in order to compensate for nose heaviness during a turn. Similarly, the pitch signal mixer may be used alone to cause joint operation of the rudder and elevator in response to pitch control signal to effect the desired pitch change in the attitude of the aircraft.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an automatic control system for aircraft having rudder and elevator control surfaces, a turn control signal generator, a pitch control signal generator, a servomotor for operating said rudder, a servomotor for operating said elevator, signal mixing means comprising first and second inductive devices, each of said inductive devices having a primary winding and first and second secondary windings, said primary and secondary windings being relatively rotatable and said secondary windings being so spaced that the voltage induced in the first of said secondary windings decreases in response to relative angular displacement of said primary and secondary windings from a neutral position and the voltage induced in said second secondary winding increases with said angular displacement, means for energizing the primary winding of said first inductive device in accordance with the output of said turn control signal generator, means for energizing the primary winding of said second inductive device in accordance with the output of said pitch control signal generator, mechanical drive means for rotating the rotatable parts of said inductive devices in unison, the neutral position of both of said inductive devices being synchronized, means for actuating said drive means in accordance with the angle of bank of said aircraft, means for algebraically adding the voltages induced in the first secondary winding of said first inductive device and the second secondary winding of said second inductive device to obtain a resultant rudder control signal, means for algebraically adding the voltages induced in the second secondary winding of said first inductive device and the first secondary winding of said second inductive device to obtain a resultant elevator control signal, and means for controlling said rudder and elevator servomotors in accordance with said resultant rudder and elevator control signals.

2. In an automatic control system for an aircraft having rudder and elevator control surfaces, a turn control signal generator, a pitch control signal generator, a servomotor for operating said rudder control surface, a servomotor for operating said elevator control surface, first and second inductive devices, each of said inductive devices having a primary winding and first and second secondary windings, said primary and secondary windings being relatively rotatable and said secondary windings being spaced so that the voltage induced in the first of said secondary windings varies approximately as the sine of the relative angular displacement of said primary and secondary windings from a neutral position and the voltage induced in said second secondary windings varies approximately as the cosine of said angular displacement, means for energizing the primary winding of said first inductive device in accordance with the output of said turn control signal generator, means for energizing the primary winding of said second inductive device in accordance with the output of said pitch control signal generator, mechanical drive means for rotating the rotatable parts of said inductive devices in unison, the neutral position of both of said inductive devices being synchronized, means for actuating said drive means in accordance with the angle of bank of said aircraft, means for algebraically adding the voltages induced in the first secondary winding of said first inductive device and the second secondary winding of said second inductive device to obtain a resultant rudder control signal, means for algebraically adding the voltages induced in the second secondary winding of said first inductive device and in the first secondary winding of said second inductive device to obtain a resultant elevator control signal, and means for controlling said rudder and elevator servomotors in accordance with said resultant rudder and elevator control signals.

3. In an automatic pilot for aircraft having rudder, aileron, and elevator control surfaces for controlling the movement of said aircraft about turn, bank, and pitch axes, respectively, rudder, aileron, and elevator servomotors for actuating said rudder, aileron, and elevator control surfaces, rudder, aileron, and elevator signal circuits for controlling said rudder, aileron, and elevator servomotors, means for introducing in said rudder, aileron, and elevator signal circuits turn, bank, and pitch signals respectively, said turn, bank, and pitch signals being variable in accordance with the displacement of said aircraft about the turn, bank, and pitch axes to cause operation of said servomotors to stabilize said aircraft about said control axes, turn control means for altering the signal introduced in said rudder control circuit to cause a turning of said aircraft, bank setter means for altering the signal introduced in said aileron signal circuit so as to vary the stabilized angle of bank of said aircraft, signal mixer means for introducing a variable portion of the turn signal into the elevator signal circuit and for introducing a variable portion of the pitch signal into the rudder signal circuit to correct the controlling action of said rudder and elevator as the angle of bank changes, and a turn controller for actuating said turn control means, said bank setter means, and said signal mixing means for effecting stabilized coordinated turns of said aircraft.

DONALD R. WEBB.

REFERENCES CITED

The following references are of record in the file of this patent:

UNITED STATES PATENTS

| Number | Name | Date |
|---|---|---|
| 1,869,840 | Boykow | Aug. 2, 1932 |
| 2,005,530 | Boykow | June 18, 1935 |
| 2,162,862 | Protzen | June 20, 1939 |
| 2,190,390 | Thiry | Feb. 13, 1940 |
| 2,190,391 | Thiry | Feb. 13, 1940 |
| 2,196,385 | De Florez et al. | Apr. 9, 1940 |